(12) United States Patent
Ghaskadvi et al.

(10) Patent No.: US 9,582,508 B2
(45) Date of Patent: Feb. 28, 2017

(54) MEDIA ORCHESTRATION THROUGH GENERIC TRANSFORMATIONS

(75) Inventors: Vijay Sadanand Ghaskadvi, San Jose, CA (US); Brian Lawrence Riggs, Berkeley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1401 days.

(21) Appl. No.: 12/173,498

(22) Filed: Jul. 15, 2008

(65) Prior Publication Data
US 2014/0250104 A1    Sep. 4, 2014

(51) Int. Cl.
  *G06F 7/00*     (2006.01)
  *G06F 17/30*    (2006.01)
(52) U.S. Cl.
  CPC .............................. *G06F 17/30076* (2013.01)
(58) Field of Classification Search
  None
  See application file for complete search history.

(56) References Cited

U.S. PATENT DOCUMENTS

| 7,581,166 | B2 | 8/2009 | Renger et al. |
| 7,783,767 | B2* | 8/2010 | Collazo ........................ 709/229 |
| 2006/0256130 | A1* | 11/2006 | Gonzalez ..................... 345/619 |
| 2006/0268667 | A1 | 11/2006 | Jellison et al. |
| 2007/0043766 | A1 | 2/2007 | Nicholas et al. |

* cited by examiner

*Primary Examiner* — Usmaan Saeed
*Assistant Examiner* — Paul Kim
(74) *Attorney, Agent, or Firm* — Kilpatrick Townsend & Stockton LLP

(57) ABSTRACT

Methods and apparatus provide for a Transformer that detects a selection to playback content and downloads a file in response to detecting the selection to playback content. The file is in a first format and includes a first reference to a location of secondary content that is in a first format that is incompatible with the first format of the file. The Transformer transforms the secondary content to a format compatible with the first format of the file and creates a second reference to the location of the transformed secondary content that is in the format compatible with the first format of the file.

19 Claims, 8 Drawing Sheets

```
<smil xmlns="http://www.w3.org/2005/SMIL21/Language"
xmlns:amp="http://www.adobe.com/amp/1.0">
<head>
    <layout>
        <region id="banner" />
        <region id="content" />
    </layout>
</head>
<body>
<par>
    <seq>
        <ref src="http://adnetwork.com/content1.xml" section="1" dur="30s" >
            <amp:transformer method="xsl" url="http://www.adnetwork.com/content1.xsl" />
        </ref>
    </seq>
    <seq>
        <ref src="http://adnetwork.com/content1.xml" section="2" dur="30s" >
            <amp:transformer method="xsl" url="http://www.adnetwork.com/content1.xsl" />
        </ref>
        <video region="content" src="http://publisher.com/content1.flv" dur="300s" >
        <ref src="http://adnetwork.com/content1.xml" section="3" dur="30s" >
            <amp:transformer method="xsl" url="http://www.adnetwork.com/content1.xsl" />
        </ref>
        <video region="content" src="http://publisher.com/content2.flv" dur="300s" >
        <ref src="http://adnetwork.com/content1.xml" section="4" dur="30s" >
            <amp:transformer method="xsl" url="http://www.adnetwork.com/content1.xsl" />
        </ref>
    </seq>
</par>
</body>
</smil>
```

MEDIA ORCHESTRATION THROUGH GENERIC TRANSFORMATIONS

CROSS REFERENCE TO RELATED APPLICATIONS

This Patent Application is related to co-pending U.S. patent application Ser. No. 12/173,527, entitled "INTEGRATION OF CUSTOM WEB APPLICATION PROGRAMMING INTERFACES WITH RSS AGGREGATION" and filed on Jul. 15, 2008, the contents and teaching of which are hereby incorporated by reference in their entirety.

BACKGROUND

Conventional computer systems allow for the production and distribution of multimedia data, including video, audio and image data. Such production is increasing at a phenomenal rate due to the growing popularity of the Internet, the growing affordability of personal computers capable of efficiently processing multimedia data to provide a pleasing experience for users, as well as the fact that multimedia data is far superior to text-only data in conveying content-rich information.

People now access and use multimedia data in numerous ways. One way that people access multimedia data is over a network. For example, people using web browsers on personal computers now access multimedia data by surfing the World Wide Web via the Internet. Countless numbers of content providers link multimedia data to web pages accessible by people using web browsers. Today, persons using web browsers can access a web page from a web server operated by a content provider to view video clips, listen to audio clips, or view images made available by the content provider.

When a client requests a piece of media content such as digital video, audio, or some other sampled content from a server, the client typically provides the global address of the content in the form of a Uniform Resource Locator (URL). A server then accesses the content and sends or "streams" it to the client as a continuous data stream.

There are various file formats for streaming media content and composite media streams. Regardless of the streaming file format used, an individual data stream may contain a sequence of digital data sets or units. The units can represent an image, sound, or some other stimuli that is perceived by a human to be continuously varying. The client can render the units individually, or in sequence, to reproduce the original stimuli. For example, a video data stream includes a sequence of digitally specified graphics frames that are rendered in sequence to produce a moving picture.

A playlist file, for conventional systems, can contain information such as whether to play certain pieces of media content more than one time, which pieces of media content to play, the order in which to play referenced media content, and the like. Playlist files also can contain references to one or more media streams and describe how pieces of media are to be combined. Playlists do not contain the actual media data, but rather references to the media data. As a result, playlist files are typically small, generally only containing text, and are generally easy and computationally inexpensive to modify. References to a single piece of media may appear in many playlist files.

Conventional playlist files have the effect of combining several individual pieces of media content into one single complex piece of content, and they are important to providers of streaming media. They allow content providers to combine advertisements with other content, and therefore build a business based on advertising revenue. They allow Internet radio stations to create a playlist of broadcast songs. They also allow providers to brand their content by attaching previews or radio-station identifiers before or after the content.

Conventional playlists are implemented either on a client or on a server. The playlist is typically downloaded from a server such as a Web server, a file server, and/or the like. The client interprets the playlist file to present a series of requests to one or more servers to access at least a portion of the content represented in the playlist. A server is generally not aware whether the client is requesting content based on a corresponding reference in the currently executed client-side playlist file or whether the client obtains the reference from a source other than a playlist. This is because, from the server's perspective, use of a client-side playlist is indistinguishable from a client communicating a number of non-playlist generated requests to the server to play several different pieces of content one after the other.

BRIEF DESCRIPTION

Current conventional systems suffer from a variety of deficiencies. Specifically, conventional systems do not offer format flexibility for advertisers who wish to provide advertising content to accompany certain types of content that a user can choose to view on a media player. Thus, if an advertiser decides to provide a feed of advertising content, the advertiser is forced to format their feed (and the content provided via the feed) according to the requirements of each users' conventional media player. Requiring advertisers to reformat their feed complicates delivery of advertising content because the advertiser may improperly reformat their feed—thereby creating error prone feeds that will interfere with the user's conventional media player experience. Moreover, the advertiser may decide that such reformatting is too much work and choose to not provide any advertising content at all.

Rather than relying on the advertiser to reformat their feed, the developer of the conventional media player can reformat the advertiser's feed before allowing users access to the advertiser's feed. However, such an approach is inefficient as it requires the developer of the conventional media player to invest time and resources into reformatting all feeds from every advertiser even though some feeds may be consumed more often by users than other feeds. In addition, upon reformatting the feeds, the developer of the conventional media player must store the reformatted feeds and manage proper delivery of the reformatted feed to users.

Techniques discussed herein significantly overcome the deficiencies of conventional applications. As will be discussed further, certain specific embodiments herein are directed to a Transformer to be executed at a client system.

For example, in one embodiment, the Transformer runs in conjunction with a media player running at a user's client system. The Transformer detects when a user decides to view content via the media player. Upon detecting the user's decision to view content, the Transformer downloads a file, such as an Adobe Media Orchestration Document (AMOD), that contains a reference to a location of secondary content. However, the secondary content is described in a format that is not compliant (i.e. incompatible) with the file's format. Thus, in order to allow the user to access and view the secondary content, the secondary content needs to be described according to the file's format. The downloaded file also includes a reference to a location of a transformation document that provides transformation rules. The transformation rules describe how to transform secondary content into a format that is compatible with the file's format.

The Transformer performs such secondary content transformation at the client system, contemporaneously with the user's selection to playback the content. Thus, the Transformer downloads the secondary content and also downloads the transformation document to the client system and creates a transform (or a chain of transforms) from the transformation rules provided in the transformation document. The Transformer processes the secondary content through the transform (or chain of transforms) in order to create a version of secondary content that is compatible with the file's format.

The Transformer locally stores the "compatible" version of the secondary content and creates a second reference that points to the location of the "compatible" version of the secondary content. The Transformer places the second reference to the location of "compatible" version of the secondary content in the file. The Transformer passes the file, which includes the second reference to the location of the "compatible" version of the secondary content, to the media player running at the user's client system to allow the user to view secondary content at a moment that is indicated by the downloaded Adobe Media Orchestration Document (AMOD).

Specifically, in various embodiments, the Transformer detects a selection to playback content and downloads a file in response to detecting the selection to playback content. The file is in a first format and includes a first reference to a location of secondary content that is in a format that is incompatible with the first format of the file. The Transformer transforms the secondary content to a format compatible with the first format of the file and creates a second reference to the location of the transformed secondary content that is in the format compatible with the first format of the file.

In one embodiment, the secondary content can be in a format that is different than the first format of the file. Thus, the Transformer transforms the secondary content into a version of the secondary content comprising the same format as the first format of the file—where the version of the secondary content in the same format as the first format of the file is stored locally to client system running a media player application.

In another embodiment, the Transformer downloads a file to a client system. The file includes a reference to a location of secondary content, a reference to a location of a first transformation document, and a reference to a location of a second transformation document. The Transformer downloads the secondary content along with the two transformation documents. The Transformer applies a first set of transformation rules from the first transformation document to the secondary content. The Transformer applies the second set of transformation rules from the second transformation document to the output of the previous transformation (i.e. the output produced from first set of transformation rules). The resulting output is transformed so that the secondary content is expressed in a format compatible with the format of the original file.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium (e.g., tangible computer-readable medium) including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in software and hardware such as those manufactured by Adobe Systems Incorporated of San Jose, Calif., U.S.A., herein after referred to as "Adobe" and "Adobe Systems."

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note also that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following more particular description of embodiments of the methods and apparatus for defining a Transformer, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

FIG. 2 is an example block diagram of a Media Orchestration Document according to embodiments herein.

DETAILED DESCRIPTION

Methods and apparatus provide for a Transformer 150 that detects a selection to playback content and downloads a file in response to detecting the selection to playback content. The file is in a first format and includes a first reference to a location of secondary content that is in a format that is incompatible with the first format of the file. The Transformer 150 transforms the secondary content to a format compatible with the first format of the file and creates a second reference to the location of the transformed secondary content that is in the format compatible with the first format of the file.

In various embodiments, the secondary content can be advertising media that is to be displayed with respect to a presentation of the content. Examples of secondary content include, but are not limited to: banner ads, overlays, video, images, graphics, etc.

Figure 1:
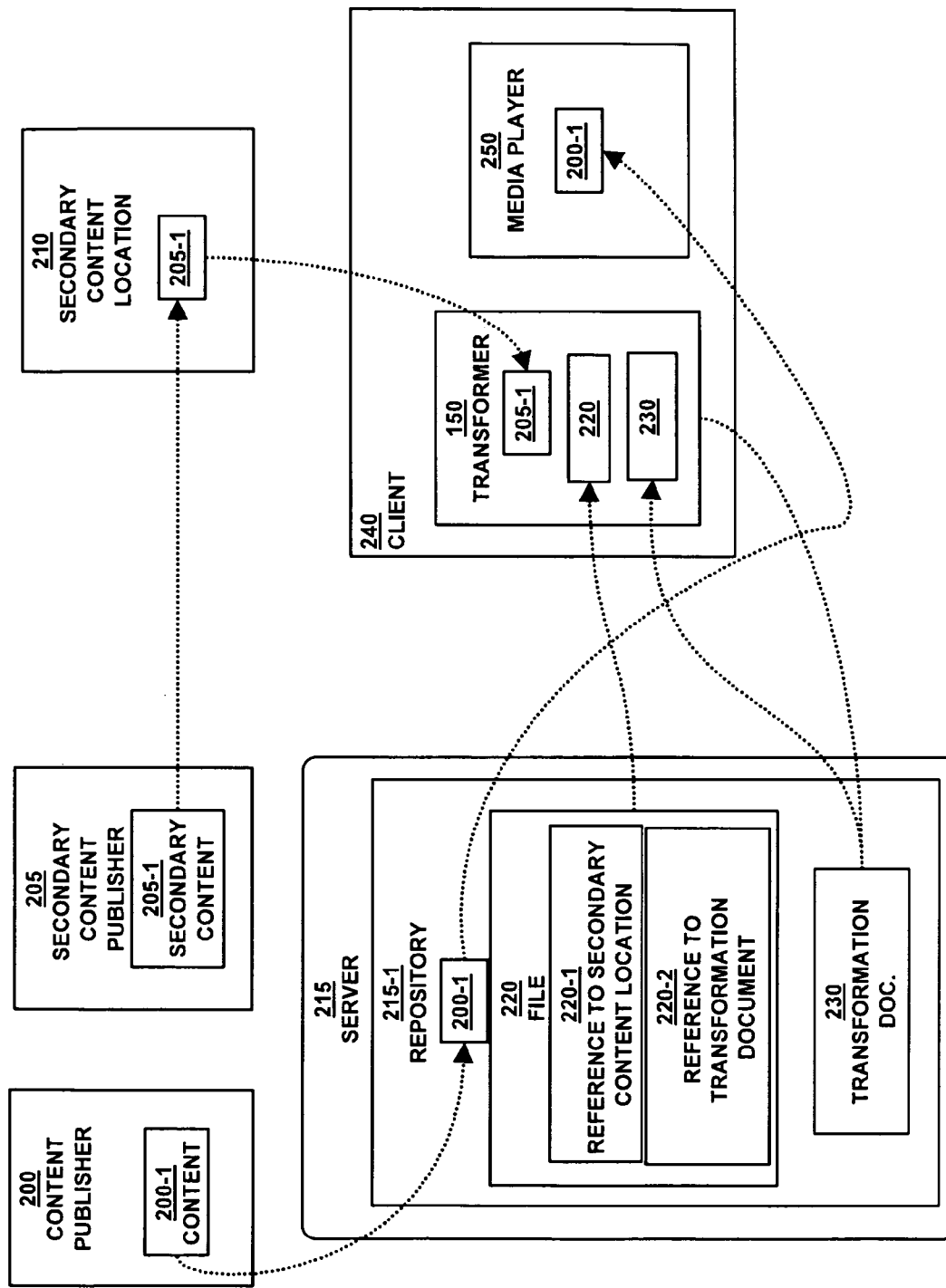
FIG. 1 is an example block diagram of a Transformer downloading a reference to a location of secondary content and a reference to a transformation document to a client system according to embodiments herein.

FIG. 1 is an example block diagram of a Transformer 150 downloading a reference to a location of secondary content and a reference to a transformation document to a client system according to embodiments herein.

A content publisher 200 creates content 200-1, which is stored in a repository 215-1 within a server 215. In addition, a secondary content publisher 205 creates secondary content 205-1, such as advertising media, that is to be displayed during a presentation of the content 200-1 rendered at a media player 250 running on a client system 240. The secondary content publisher 205 stores the secondary content 205-1 at a secondary content location 210 that is external to the client system 240.

The repository 215-1 stores a file that includes a reference to the secondary content's location 220-1 and a reference to a transformation document 220-2 (i.e. a reference to a location of a transformation document). When the Transformer 150, which runs on the client system 240 in conjunction with the media player 250, detects that the user has selected to playback the content 200-1 in the media player 250, the Transformer 150 downloads the file 220 to the client system 240.

The Transformer utilizes the reference to the secondary content's location 220-1 to download the secondary content 205-1 to the client 240. Upon downloading the secondary content 205-1, the Transformer 150 detects that the format of the secondary content 205-1 is in a format incompatible with the file's 220 format.

The Transformer 150 utilizes the reference to the transformation document 220-2 to download a transformation document 230 from the server 215. It is noted that in various embodiments, the transformation document 230 need not be located at the same server as the file 220.

FIG. 2 is an example block diagram of a Media Orchestration Document according to embodiments herein.

In one embodiment, the Transformer 150 downloads a file 220 that is a Media Orchestration Document (MOD)—also known as a Media Orchestration Descriptor. The MOD defines media orchestration (i.e. presenting and sequencing of media segments) in a media player. The MOD represents pre-defined user interface regions and media elements (i.e. media segments of the media content) and/or secondary content, such as, for example, videos, advertisements, graphics and images which are bound to those regions. Tags such as <seq> and <par> further define containers for the media elements to indicate sequential or parallel execution of one or media elements, respectively.

A parallel container in the MOD is denoted by <par>, which can include one or more media elements (i.e. media components, media assets, media segments, media effects) of the media content. The duration of a parallel container is calculated as the duration of the longest media elements within the parallel container. For example, if the duration of three videos within a parallel container is 70 seconds, 25 seconds and 55 seconds, respectively, then the duration of the parallel container is calculated to be 70 seconds.

A sequential container, denoted by <seq>, has a duration calculated to be the sum of each duration of media elements within the sequential container. Thus, if the duration of three videos within the sequential container were respectively 70 seconds, 25 seconds and 55 seconds, then the duration of the sequential container is calculated to be 150 seconds.

Timing attributes for the media elements organized in the MOD can be included to indicate when the media elements are played back, such as <begin>, <end> and <dur>. The media elements referenced by the MOD can be downloaded, stored on to a local disk on the user's computer, and/or placed in a buffer that is communicating with the user's media player.

As illustrated in FIG. 2, the file 220 includes a reference to a location of secondary content 220-1 where the secondary content 205-1 is in a proprietary Extensible Markup Language (XML) format specified by the source of the secondary content 205-1. However, the file 220 corresponds to a Synchronized Multimedia Integration Language (SMIL) format. Thus, the secondary content's 205-1 format is incompatible with file's 220 format.

Rather than requiring the source of the secondary content 205-1 to reformat the secondary content 205-1 to be compatible with the SMIL format, the Transformer 150 downloads and transforms the secondary content 205-1 to create a version of the secondary content that is compatible with the SMIL format.

In various embodiments, such secondary content transformation occurs at a client system during run-time and further occurs contemporaneously with a user's selection to playback content with which the secondary content is to be presented. Thus, neither the source of the secondary content nor the developer of the media player have to reformat the secondary content prior to the user's selection to play the content during which the secondary content is to be presented. It is understood that embodiments of the Transformer 150 are not limited to a file 220 in a SMIL format.

Figure 3:
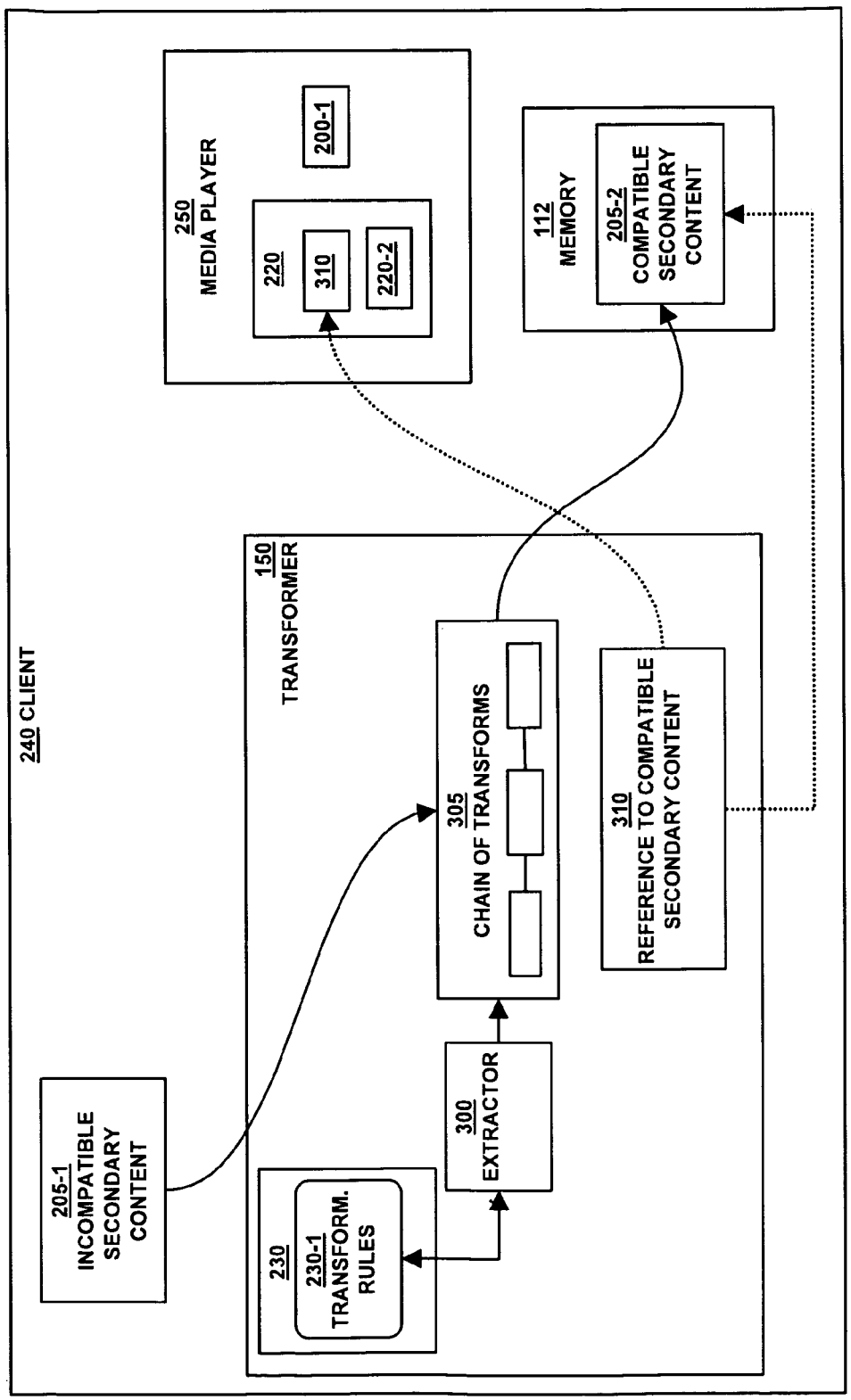
FIG. 3 is an example block diagram of a Transformer 150 transforming secondary content described in an incompatible format and creating a second reference to a location of secondary content described in a compatible format according to embodiments herein.

FIG. 3 is an example block diagram of a Transformer 150 transforming secondary content described in an incompatible format and creating a second reference to a location of secondary content described in a compatible format according to embodiments herein.

When the Transformer 150 has downloaded to the secondary content 205-1 (i.e. the secondary content 205-1 that is incompatible with the format of the file 220) and the transformation document 230 to the client-system 240, the Transformer 150 utilizes an extractor 300 to extract transformation rules 230-1 from the transformation document 230.

Based on the extracted transformation rules 230-1, the extractor 300 builds a chain of transforms 305 that successively transform the downloaded secondary content 205-1, thereby creating a version of the secondary content 205-2 that is compatible with the file's 200 format. The Transformer 150 locally stores the "compatible" version of the secondary content 205-2 in memory 112 and creates a reference 310 that points to the "compatible" version of the secondary content 205-2. The Transformer 150 merges the reference 310 to the "compatible" secondary content 205-2 into the file 220 so that the media player can invoke the reference 310 in order to obtain the "compatible" secondary content 205-2 during presentation of the content 200-1.

Figure 4:
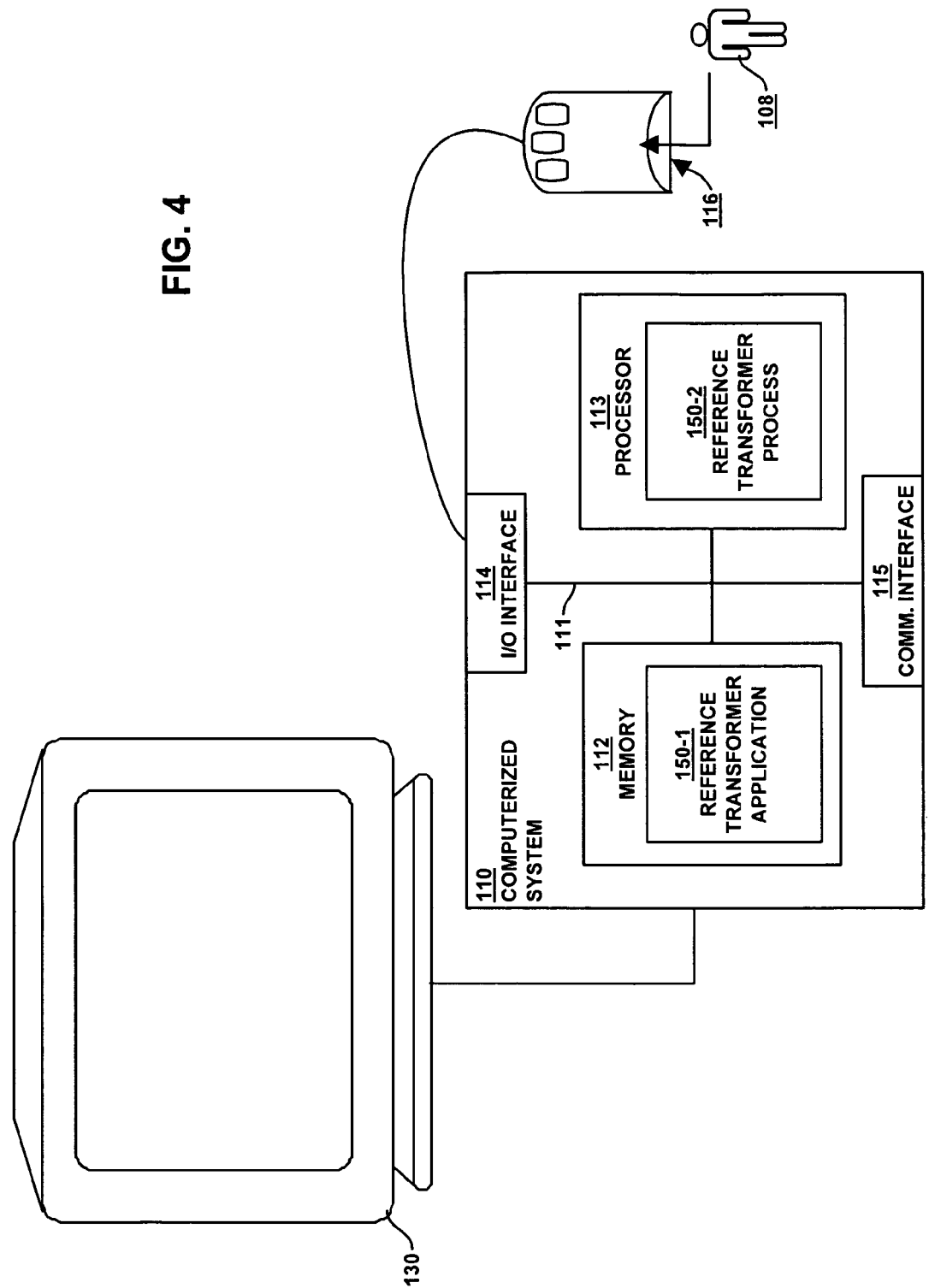
FIG. 4 is an example block diagram illustrating an architecture of a computer system that executes a Transformer application and/or a Transformer process according to embodiments herein.

FIG. 4 is an example block diagram illustrating an architecture of a computer system 110 that executes, runs, interprets, operates or otherwise performs a Transformer application 150-1 and/or Transformer process 150-2 (e.g. an executing version of a Transformer 150 as controlled or configured by user 108) according to embodiments herein.

Note that the computer system 110 may be any type of computerized device such as a personal computer, a client system 240, workstation, portable computing device, console, laptop, network terminal, etc. This list is not exhaustive and is provided as an example of different possible embodiments.

In addition to a single computer embodiment, computer system 110 can include any number of computer systems in a network environment to carry the embodiments as described herein.

As shown in the present example, the computer system 110 includes an interconnection mechanism 111 such as a data bus, motherboard or other circuitry that couples a memory system 112, a processor 113, an input/output interface 114, and a display 130. If so configured, the display can be used to present a graphical user interface of the Transformer 150 to user 108. An input device 116 (e.g., one or more user/developer controlled devices such as a keyboard, mouse, touch pad, etc.) couples to the computer system 110 and processor 113 through an input/output (I/O) interface 114. The computer system 110 can be a client system and/or a server system. As mentioned above, depending on the embodiment, the Transformer application 150-1 and/or the Transformer process 150-2 can be distributed and executed in multiple nodes in a computer network environment or performed locally on a single computer.

During operation of the computer system 110, the processor 113 accesses the memory system 112 via the interconnect 111 in order to launch, run, execute, interpret or otherwise perform the logic instructions of the Transformer application 150-1. Execution of the Transformer application 150-1 in this manner produces the Transformer process 150-2. In other words, the Transformer process 150-2 represents one or more portions or runtime instances of the Transformer application 150-1 (or the entire application 150-1) performing or executing within or upon the processor 113 in the computerized device 110 at runtime.

The Transformer application 150-1 may be stored on a computer readable medium (such as a floppy disk), hard disk, electronic, magnetic, optical, or other computer readable medium. It is understood that embodiments and techniques discussed herein are well suited for other applications as well.

Those skilled in the art will understand that the computer system 110 may include other processes and/or software and hardware components, such as an operating system. Display 130 need not be coupled directly to computer system 110. For example, the Transformer application 150-1 can be executed on a remotely accessible computerized device via the communication interface 115.

FIG. 5 through FIG. 8 illustrate various embodiment of the Transformer 150. The rectangular elements in flowcharts 500, 600, 700 and 800 denote "processing blocks" and represent computer software instructions or groups of instructions upon a computer readable medium. Additionally, the processing blocks represent steps performed by hardware such as a computer, digital signal processor circuit, application specific integrated circuit (ASIC), etc.

Flowcharts 500, 600, 700 and 800 do not necessarily depict the syntax of any particular programming language. Rather, flowcharts 500, 600, 700 and 800 illustrate the functional information one of ordinary skill in the art requires to fabricate circuits or to generate computer software to perform the processing required in accordance with the present invention.

It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 5:
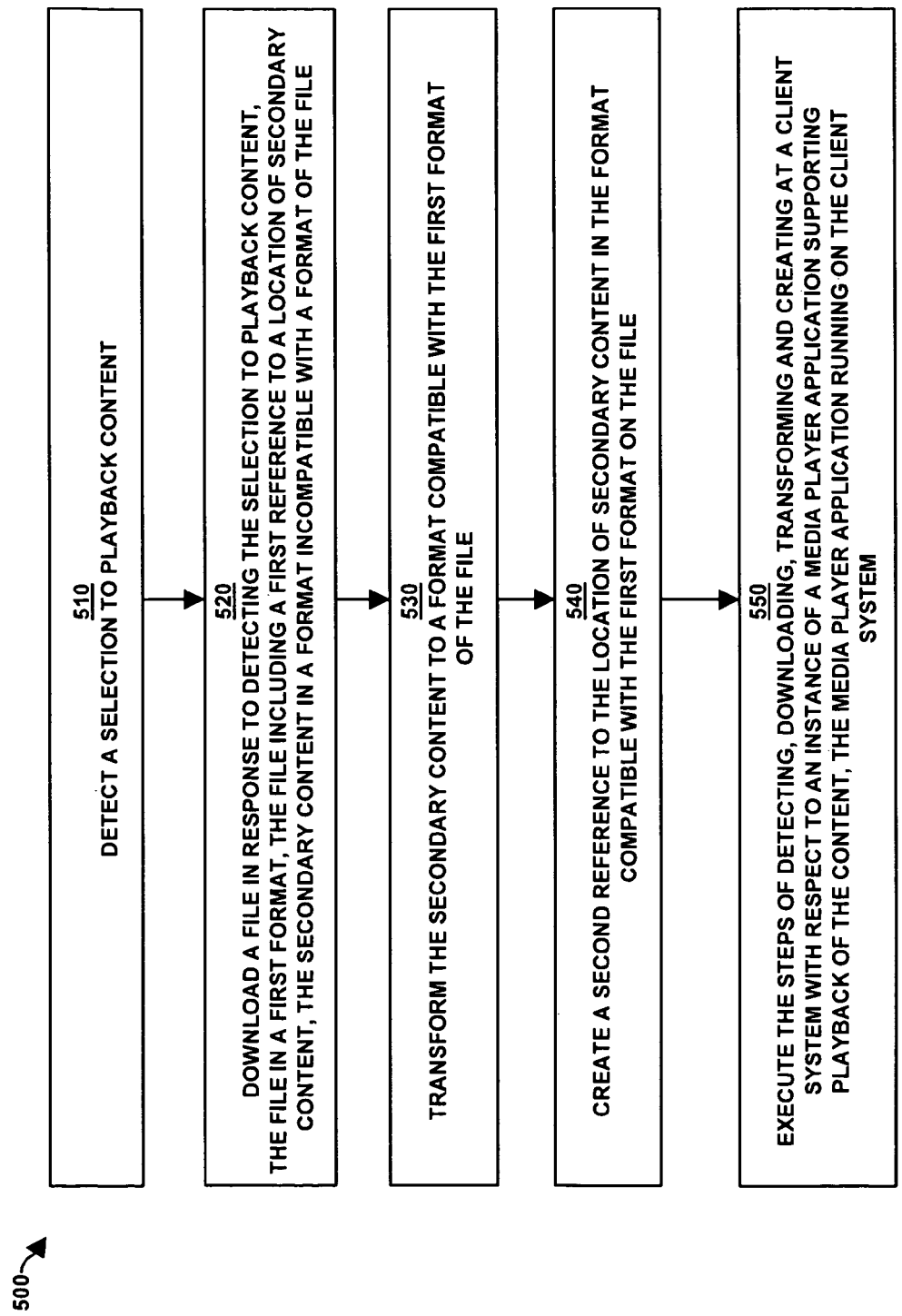
FIG. 5 is a flowchart of an example of processing steps performed by the Transformer to transform secondary content according to embodiments herein.

FIG. 5 is a flowchart 500 of an example of processing steps performed by the Transformer 150 to transform secondary content according to embodiments herein.

At step 510, the Transformer 150 detects a selection to playback content. For example, the Transformer 150 can be running at a client system in conjunction with a media player application so that the Transformer 250 detects when a user selects content to be played on the media player.

At step 520, the Transformer 150 downloads a file in response to detecting the selection to playback content. The file is formatted in a first format and includes a first reference to a location of secondary content. The secondary content is formatted in a format that is incompatible with the first format of the file.

When the Transformer 150 downloads the file at step 520, the Transformer 150 receives the first reference to the location of secondary where the secondary content is defined for presentation for a duration of time and in conjunction with playback of the content. In one embodiment, it is understood that the first format of the file can be a Synchronized Multimedia Integration Language (SMIL) format.

At step 530, the Transformer 150 transforms secondary content to that is in a format compatible with the first format of the file.

At step 540, the Transformer 150 creates a second reference to the location of secondary content (i.e. the transformed secondary content from step 530) in a format compatible with the first format of the file. Thus, in one embodiment, where the file is in a SMIL format, then Transformer 150 creates a version of the secondary content that is compatible with the SMIL format.

At step 550, the Transformer 150 executes the steps (510-540) of detecting, downloading, transforming and creating at a client system with respect to an instance of a media player application that supports playback of the content.

Figure 6:
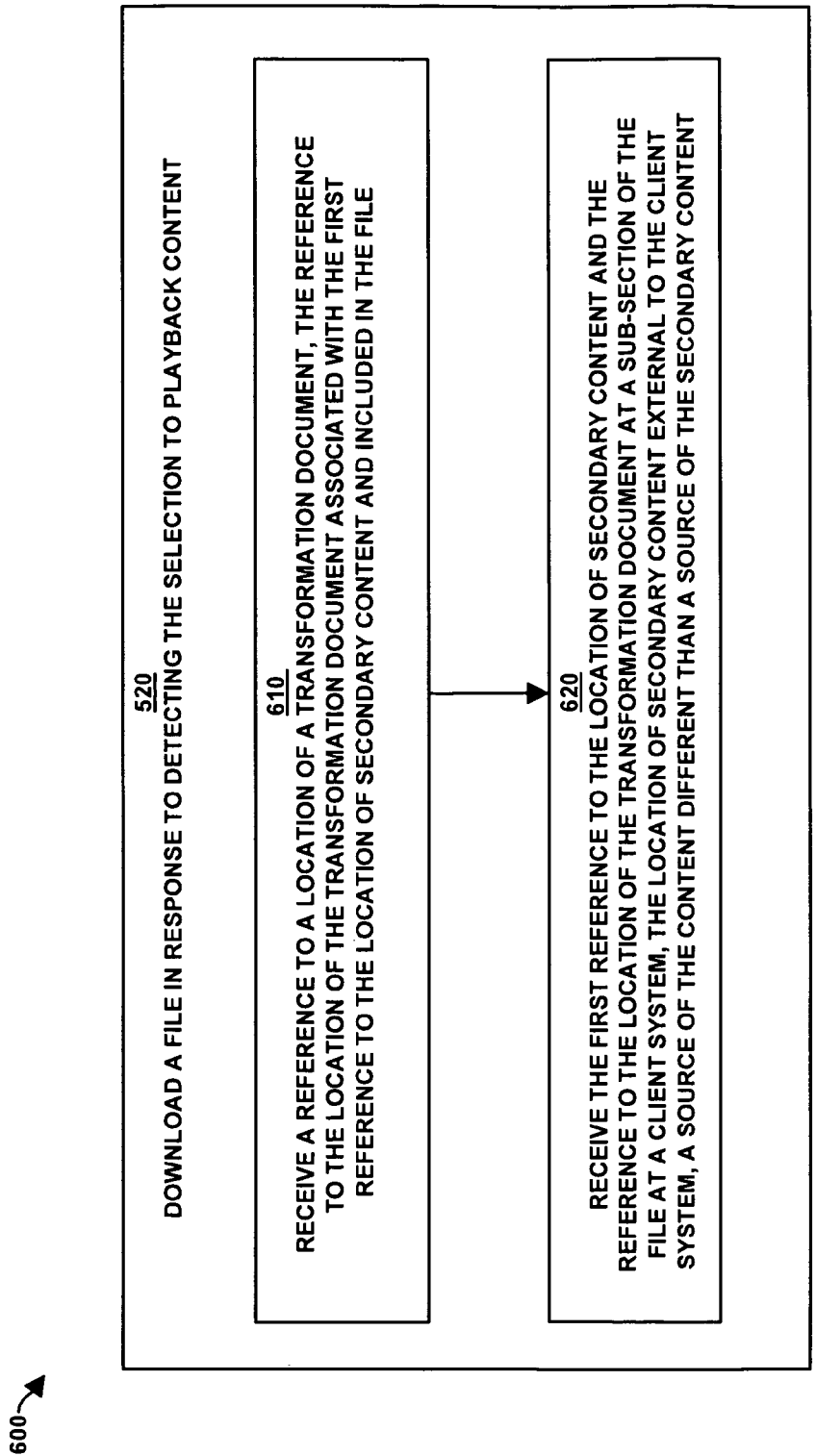
FIG. 6 is a flowchart of an example of processing steps performed by the Transformer to download a transformation document according to embodiments herein.

FIG. 6 is a flowchart 600 of an example of processing steps performed by the Transformer 150 to download a transformation document according to embodiments herein.

At step 610, when the Transformer downloads the file as in step 520, the Transformer 150 receives a reference to a location of a transformation document(s). It is understood that the reference to the location of the transformation document is includes in the file and is associated with the first reference to the location of secondary content.

At step 620, the Transformer 150 receives the first reference to the location of secondary content and the reference to the location of the transformation document at a subsection of the file at a client system. Thus, the Transformer 150 does not need to apply transformation rules to the entire file. It is noted that, in various embodiments, the location of the secondary content can be external to the client system and a source of the content is different than a source of the secondary content.

Figure 7:
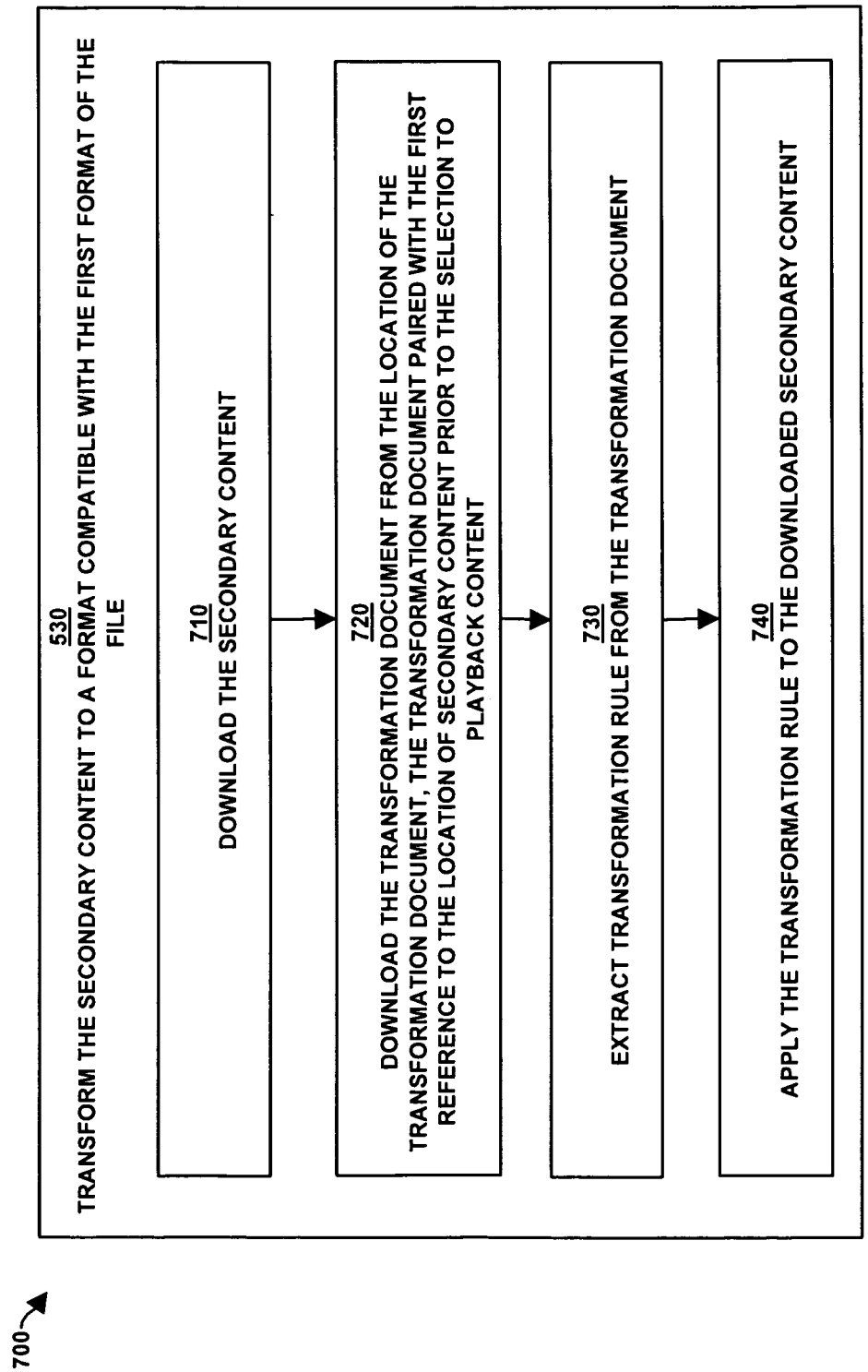
FIG. 7 is a flowchart of an example of processing steps to be performed by the Transformer to transform secondary content according to embodiments herein according to embodiments herein.

FIG. 7 is a flowchart 700 of an example of processing steps to be performed by the Transformer 150 to transform secondary content according to embodiments herein according to embodiments herein.

At step 710, the Transformer 150 downloads the secondary content.

At step 720, the Transformer 150 downloads the transformation document from the location of the transformation document. It is noted that the transformation document is paired (i.e. associated) with the first reference to the location of secondary content prior to the selection to playback content.

At step 730, the Transformer 150 extracts a transformation rule(s) from the transformation document.

At step 740, the Transformer 150 applies the transformation rule(s) to the downloaded secondary content.

In one embodiment, when the Transformer 150 downloads the file that includes the first reference to the location of secondary content includes, the Transformer 150 receives the first reference describing the secondary content in a proprietary Extensible Markup Language (XML) format. The source of the secondary content specifies (i.e. defines) the proprietary XML format.

In addition, when the Transformer 150 downloads the transformation document, the Transformer 150 downloads an Extensible Stylesheet Language Transformation (XSLT) document that provides one or more transformation rules that describe how to transform the downloaded secondary content that is formatted according to the proprietary XML format into a format compatible with the format of the file. It is understood that embodiments of the Transformer 150 are not limited to first references to the location of secondary content in a proprietary Extensible Markup Language (XML) format.

Figure 8:
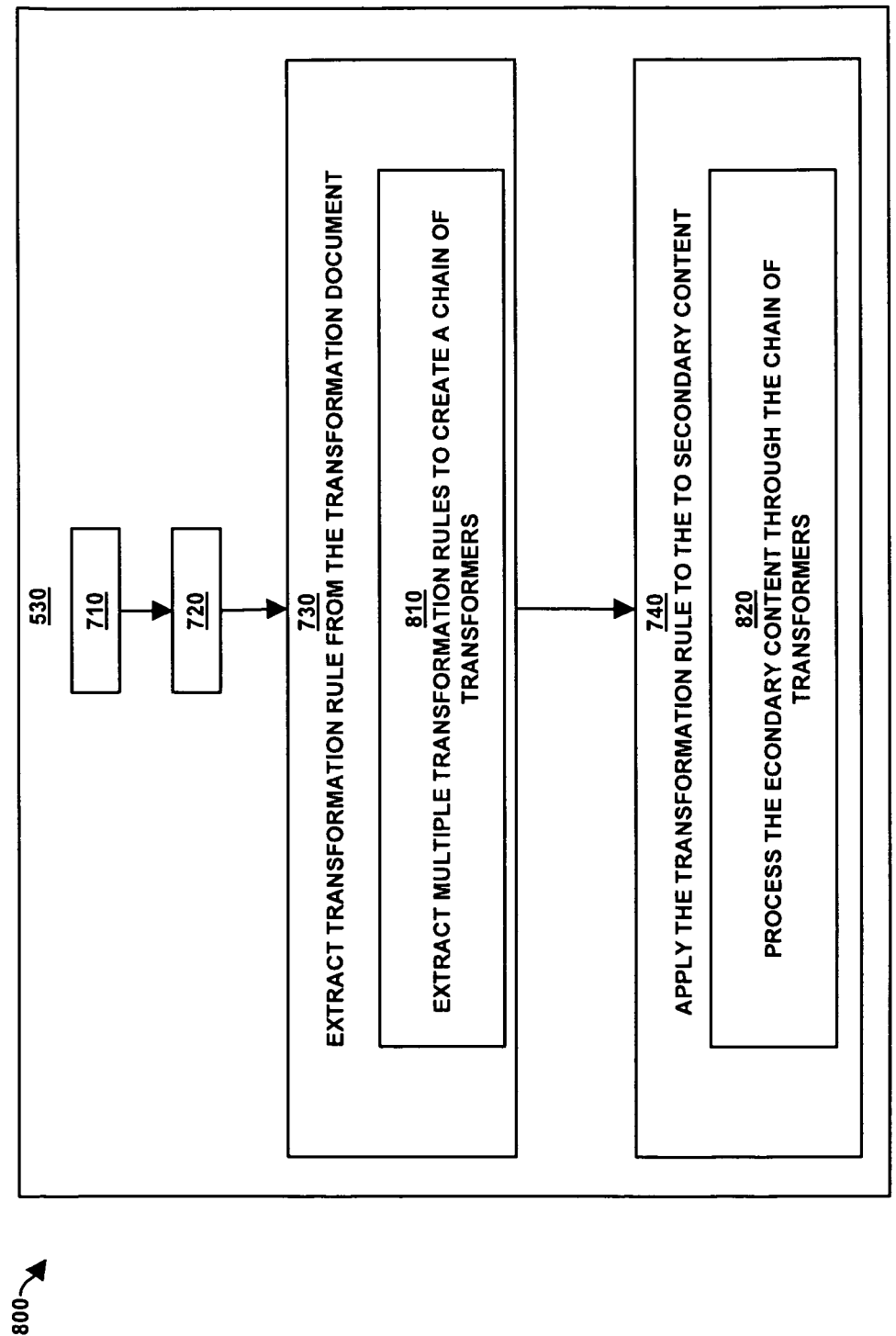
FIG. 8 is a flowchart of an example of processing steps to be performed by the Transformer to create a chain of transforms according to embodiments herein.

FIG. 8 is a flowchart 800 of an example of processing steps to be performed by the Transformer to create a chain of transforms according to embodiments herein.

At step 810, when the Transformer 150 extracts a transformation rule(s), the Transformer 150 extracts multiple transformation rules to create a chain of transformers.

When the Transformer applies the transformation rule(s), at step 820, the Transformer 150 processes the secondary content through the chain of transformers.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a processor", or "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet, as well as a virtual network. References herein to microprocessor instructions or microprocessor-executable instructions, in accordance with the above, may be understood to include programmable hardware.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method comprising:
    detecting, by a processor of a client system, a selection to play content by a media player application at the client system; and
    in response to and contemporaneously with the client system detecting the selection to play the content:
        downloading, by the processor, a media orchestration file, wherein the media orchestration file is in a first format and defines the presentation of one or more media segments comprising the content;
        detecting that the media orchestration file includes a first reference to a location of secondary content in a format incompatible with the first format of the media orchestration file such that the media player application executing at the client system and supporting using the media orchestration file to play the content does not support playback of the secondary content;
        downloading, by the processor, a transformation document comprising at least one transformation rule specifying a process for transforming, by the processor, the secondary content to a format compatible with the first format of the media orchestration file, such that the media player application supports playback of the transformed secondary content;
        applying, by the processor, the at least one transformation rule to the secondary content to generate transformed secondary content;
        creating, by the processor, a second reference to the location of the transformed secondary content; and
        inserting, by the processor, the second reference in the media orchestration file.

2. The method as in claim 1, wherein downloading the media orchestration file includes:
    receiving, by the processor, a reference to a location of the transformation document, the reference to the location of the transformation document associated with the first reference to the location of secondary content, the reference to the location of the transformation document included in the media orchestration file.

3. The method as in claim 2, comprising:
    receiving, by the processor, the first reference to the location of secondary content and the reference to the location of the transformation document at a subsection of the media orchestration file at a client system, the location of secondary content external to the client system, a source of the content different than a source of the secondary content.

4. The method as in claim 2 further comprising:
    downloading, by the processor, the secondary content;
    extracting, by the processor, at least one transformation rule from the transformation document; and
    applying, by the processor, the at least one transformation rule to the downloaded secondary content.

5. The method as in claim 1, comprising:
    wherein detecting that the media orchestration file includes the first reference to the location of secondary content in the format incompatible with the first format of the media orchestration file includes:
        determining, by the processor, that the first reference describes the secondary content in a proprietary Extensible Markup Language (XML) format, the proprietary XML format specified by a source of the secondary content; and
    wherein downloading the transformation document includes:
        downloading, by the processor, an Extensible Stylesheet Language Transformation (XSLT) document, the XSLT document specifying a process for transforming the secondary content in the proprietary XML format to a Synchronized Multimedia Integration Language (SMIL) format of the media orchestration file.

6. The method as in claim 1, further comprising:
    extracting the at least one transformation rule from the transformation document by extracting, by the processor, multiple transformation rules to create a chain of transformers; and
    wherein applying the at least one transformation rule includes processing, by the processor, the secondary content through the chain of transformers.

7. The method as in claim 1, comprising:
    wherein downloading the media orchestration file includes downloading, by the processor, a media orchestration file in a Synchronized Multimedia Integration Language (SMIL) format; and
    wherein transforming the secondary content includes:
        transforming, by the processor, the secondary content into a version of the secondary content compatible with the SMIL format.

8. The method as in claim 1, wherein downloading the media orchestration file further comprises:
    receiving, by the processor, a reference to a location of secondary content, the secondary content defined for presentation for a duration of time and in conjunction with playback of the content.

9. A non-transitory computer readable medium comprising executable instructions encoded thereon operable on a computerized device to perform processing comprising:
instructions for detecting, at a client system, a selection to play content at the client system; and
instructions for, in response to and contemporaneously with the client system detecting the selection to play the content:
downloading, at the client system, a media orchestration file, wherein the media orchestration file is in a first format and defines the presentation of one or more media segments comprising the content;
detecting, at the client system, that the media orchestration file includes a first reference to a location of secondary content in a format incompatible with the first format of the media orchestration file such that a media player application executing at the client system and supporting using the media orchestration file to play the content does not support playback of the secondary content;
downloading, at the client system, a transformation document comprising at least one transformation rule specifying a process for transforming, at the client system, the secondary content to a format compatible with the first format of the media orchestration file, such that the media player application supports playback of the transformed secondary content;
applying at the client system, the at least one transformation rule to the secondary content to generate transformed secondary content;
creating, at the client system, a second reference to the location of the transformed secondary content; and
inserting, at the client system, the second reference in the media orchestration file.

10. The computer readable medium as in claim 9, wherein the instructions for downloading the media orchestration file include:
instructions for receiving, at the client system, a reference to a location of the transformation document, the reference to the location of the transformation document associated with the first reference to the location of secondary content, the reference to the location of the transformation document included in the media orchestration file.

11. The computer readable medium as in claim 10, comprising:
instructions for receiving, at the client system, the first reference to the location of secondary content and the reference to the location of the transformation document at a subsection of the media orchestration file at a client system, the location of secondary content external to the client system, a source of the content different than a source of the secondary content.

12. The computer readable medium as in claim 10, further comprising:
instructions for downloading, at the client system, the secondary content;
instructions for extracting, at the client system, at least one transformation rule from the transformation document; and
instructions for applying, at the client system, the at least one transformation rule to the downloaded secondary content.

13. The computer readable medium as in claim 9, comprising:
wherein the instructions for detecting that the media orchestration file includes the first reference to the location of secondary content in the format incompatible with the first format of the media orchestration file include:
instructions for determining, at the client system, that the first reference describes the secondary content in a proprietary Extensible Markup Language (XML) format, the proprietary XML format specified by a source of the secondary content; and
wherein the instructions for downloading the transformation document includes:
instructions for downloading, at the client system, an Extensible Stylesheet Language Transformation (XSLT) document, the XSLT document specifying a process for transforming the secondary content in the proprietary XML format into a Synchronized Multimedia Integration Language (SMIL) format of the media orchestration file.

14. The computer readable medium as in claim 9, further comprising:
instructions for extracting the at least one transformation rule from the transformation document by extracting, at the client system, multiple transformation rules to create a chain of transformers; and
wherein the instructions for applying the at least one transformation rule include:
instructions for processing, at the client system, the secondary content through the chain of transformers.

15. The computer readable medium as in claim 9, comprising:
wherein the instructions for downloading the media orchestration file include downloading, at the client system, a file in a Synchronized Multimedia Integration Language (SMIL) format; and
wherein the instructions for transforming the secondary content includes:
instructions for transforming, at the client system, the secondary content into a version of the secondary content compatible with the SMIL format.

16. The computer readable medium as in claim 9, the instructions for downloading the media orchestration file further comprising:
instructions for receiving, at the client system, a reference to a location of secondary content, the secondary content defined for presentation for a duration of time and in conjunction with playback of the content.

17. A computer system comprising:
a processor;
a memory unit that stores instructions associated with an application executed by the processor; and
an interconnect coupling the processor and the memory unit, enabling the computer system to execute the application and perform operations of:
detecting a selection to play content; and
in response to and contemporaneously with the computer system detecting the selection to play the content:
downloading a file in response to detecting the selection to play the content, wherein the media orchestration file is in a first format and defines the presentation of one or more media segments comprising the content;
detecting that the media orchestration file includes a first reference to a location of secondary content in a format incompatible with the first format of the media orchestration file such that a media player application executing at the computer system and supporting using the media orchestration file to play the content does not support playback of the secondary content;

downloading a transformation document comprising at least one transformation rule specifying a process for transforming the secondary content to a format compatible with the first format of the media orchestration file, such that the media player application supports playback of the transformed secondary content;

applying the at least one transformation rule to the secondary content to generate transformed secondary content;

creating a second reference to the location of the transformed secondary content; and inserting, by the processor, the second reference in the media orchestration file.

18. The method of claim 1, wherein applying the at least one transformation rule to the secondary content to generate transformed secondary content comprises generating the transformed secondary content for storage to a non-transitory computer readable medium local to the client system at which the media player application is executed and wherein the reference to the location of the transformed secondary content in the format compatible with the first format of the media orchestration file comprises a location in the non-transitory computer readable medium.

19. The method of claim 1, wherein inserting the second reference in the media orchestration file comprises replacing, by the processor, the first reference to the secondary content in a format incompatible with the first format of the media orchestration file with a second reference to the location of the transformed secondary content in the format compatible with the first format of the media orchestration file.

* * * * *